United States Patent
Schreiner et al.

(10) Patent No.: US 9,695,578 B2
(45) Date of Patent: Jul. 4, 2017

(54) WATER SUPPLY SYSTEM COMPRISING A VENTURI PIPE

(71) Applicant: Airbus Operations GmbH, Hamburg (DE)

(72) Inventors: Axel Schreiner, Bremen (DE); Paolo Cavarero, Buxtehude (DE); Hannes Müller, Hamburg (DE); Ralf Menshausen, Hamburg (DE); Markus Wirth, Hamburg (DE); Michael Rempe, Hamburg (DE); Carlos Rosero, Hamburg (DE)

(73) Assignee: Airbus Operations GmbH (DE)

( * ) Notice: Subject to any disclaimer, the term of this patent is extended or adjusted under 35 U.S.C. 154(b) by 551 days.

(21) Appl. No.: 14/175,096

(22) Filed: Feb. 7, 2014

(65) Prior Publication Data
US 2014/0151309 A1    Jun. 5, 2014

Related U.S. Application Data

(63) Continuation of application No. PCT/EP2012/065184, filed on Aug. 2, 2012.
(Continued)

(30) Foreign Application Priority Data

Aug. 12, 2011  (DE) .......... 10 2011 110 153

(51) Int. Cl.
  *C02F 1/32* (2006.01)
  *E03B 7/07* (2006.01)
(Continued)

(52) U.S. Cl.
  CPC .......... *E03B 7/078* (2013.01); *B01D 21/2405* (2013.01); *B64D 11/00* (2013.01);
(Continued)

(58) Field of Classification Search
  CPC ..... A61L 2/10; A61L 2/24; A61L 9/20; A61L 2209/11; C02F 1/008; C02F 1/283;
(Continued)

(56) References Cited

U.S. PATENT DOCUMENTS 5,303,739 A  4/1994  Ellgoth et al.
5,353,739 A  10/1994  Chu
(Continued)

FOREIGN PATENT DOCUMENTS

CA  1290151 C  10/1991
CN  87103562 A  12/1987
(Continued)

*Primary Examiner* — Dirk Bass
*Assistant Examiner* — Hayden Brewster
(74) *Attorney, Agent, or Firm* — Lerner, David, Littenberg, Krumholz & Mentlik, LLP

(57) ABSTRACT

A water supply system includes a first pipe, a water reservoir, and a Venturi pipe having a first Venturi nozzle terminal, a second Venturi nozzle terminal and a Venturi nozzle branch arranged between the first and second Venturi nozzle terminal. The first Venturi nozzle terminal is connected via the first pipe to the water reservoir. The first Venturi nozzle terminal is connectable to a second pipe to fill the water reservoir. The branch of the Venturi pipe is connectable to a third pipe to supply taps. Water flows through the Venturi pipe from the first Venturi nozzle terminal to the second Venturi nozzle terminal when the water reservoir is filled, and water flows through the Venturi pipe from the second Venturi nozzle terminal to the Venturi nozzle branch during the supply procedure, to provide a water supply system which requires less maintenance and is less temperamental.

9 Claims, 1 Drawing Sheet

Related U.S. Application Data

(60) Provisional application No. 61/522,781, filed on Aug. 12, 2011.

(51) Int. Cl.
*B64D 11/02* (2006.01)
*B01D 21/24* (2006.01)
*B64D 11/00* (2006.01)
*G05D 7/01* (2006.01)

(52) U.S. Cl.
CPC ............... *B64D 11/02* (2013.01); *C02F 1/32* (2013.01); *C02F 1/325* (2013.01); *G05D 7/01* (2013.01); *Y10T 137/2599* (2015.04); *Y10T 137/6906* (2015.04); *Y10T 137/8013* (2015.04); *Y10T 137/86035* (2015.04)

(58) Field of Classification Search
CPC .... C02F 1/30; C02F 1/32; C02F 1/325; C02F 1/72; C02F 1/78; C02F 103/00; C02F 2201/326; C02F 2201/3225; C02F 2201/3227; C02F 2201/3228; C02F 2209/40; C02F 2301/024; C02F 2303/04; B01D 21/24; B01D 53/007; B01D 53/32; B46D 11/00; B46D 11/02; B01J 8/02; B01J 9/00; B01J 19/08; B01J 19/087; B01J 19/088; B01J 19/10; B01J 19/12; B01J 19/123; B01J 19/126; B01J 2219/0852; B01J 2219/0894
USPC ............. 137/115.11, 546, 565.17, 899.2; 210/748.1, 748.11; 250/373, 431, 432, 250/432 R, 435, 436, 455.11; 340/600
See application file for complete search history.

(56) References Cited

U.S. PATENT DOCUMENTS

| | | | |
|---|---|---|---|
| 5,402,967 A | 4/1995 | Hughes | |
| 5,476,118 A | 12/1995 | Yokoyama | |
| 6,766,822 B2 | 7/2004 | Walker | |
| 2003/0052277 A1 | 3/2003 | Walker | |
| 2004/0074547 A1 | 4/2004 | Kirma | |
| 2004/0124153 A1 | 7/2004 | van de Weijer | |
| 2008/0302737 A1* | 12/2008 | Denkewicz, Jr. | C02F 1/325 210/760 |
| 2009/0159512 A1* | 6/2009 | Brattested | B01D 21/0027 209/645 |

FOREIGN PATENT DOCUMENTS

| | | |
|---|---|---|
| CN | 1326524 A | 12/2001 |
| CN | 1495097 A | 5/2004 |
| DE | 42 27 518 A1 | 4/1993 |
| DE | 692 19 143 T2 | 10/1997 |
| DE | 20 2006 015 958 U1 | 4/2007 |
| DE | 602 19 154 T2 | 12/2007 |
| EP | 0 608 416 A1 | 8/1994 |
| WO | 92/14965 A1 | 9/1992 |
| WO | 02/088027 A1 | 11/2002 |

* cited by examiner

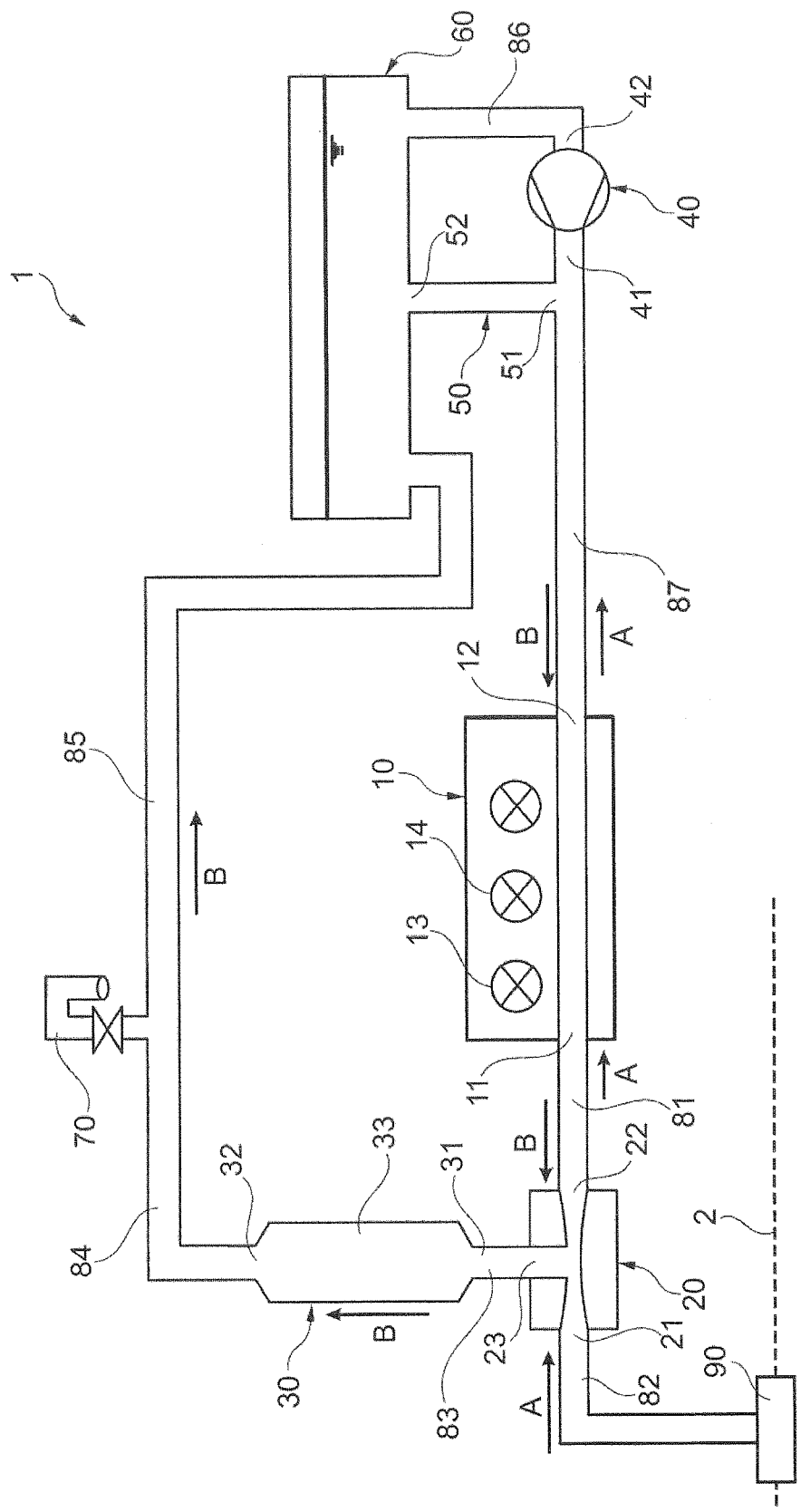

WATER SUPPLY SYSTEM COMPRISING A VENTURI PIPE

CROSS-REFERENCE TO RELATED APPLICATIONS

The present application is a continuation of International Application No. PCT/EP2012/065184 filed Aug. 2, 2012 published in English, which claims the benefit of the filing date of U.S. Provisional Patent Application No. 61/522,781 filed Aug. 12, 2011 and priority from German Patent Application No. 10 2011 110 153.9 filed Aug. 12, 2011, the disclosures of which are hereby incorporated herein by reference.

FIELD OF THE INVENTION

The invention relates to a water supply system for a passenger transport vehicle. More particularly, the invention relates to a water supply system comprising a Venturi pipe arrangement, for selective conveyance of water flows, and to an aircraft comprising a corresponding water supply system.

BACKGROUND OF THE INVENTION

In water supply systems for passenger transport vehicles, different pipes are provided, via which the water supply system can be replenished, but via which water can also be distributed within the water supply system. The desired flow paths when replenishing the water supply system are sometimes different from the flow paths during water distribution in water supply systems. During replenishment, it is desirable for example to convey the water over the shortest path from a water replenishment terminal to a water reservoir, and to prevent the water from flowing into undesired pipe branches and/or flow paths.

In order to convey the water securely and reliably over the intended flow paths during different operational processes (during both replenishment and water distribution), shut-off valves were used previously, which were opened and closed in accordance with the mode of operation in order to allow or prevent a corresponding flow through the corresponding pipes. However, mechanical shut-off elements of this type are relatively heavy and high-maintenance.

Water systems for aircraft are known for example from DE 42 27 518 A1 or U.S. Pat. No. 5,303,739.

BRIEF SUMMARY OF THE INVENTION

An aspect the invention provides a water supply system which is lighter and which requires less maintenance.

According to an exemplary embodiment of the invention, a water supply system is provided, comprising a first pipe, a water reservoir, and a Venturi pipe having a first Venturi nozzle terminal, a second Venturi nozzle terminal and a Venturi nozzle branch arranged between the first and second Venturi nozzle terminals, wherein the second Venturi nozzle terminal is connected via the first pipe to the water reservoir, wherein the first Venturi nozzle terminal is connectable to a second pipe to fill the water reservoir, wherein the branch of the Venturi pipe is connectable to a third pipe to supply taps, wherein water flows through the Venturi pipe from the first Venturi nozzle terminal to the second Venturi nozzle terminal when the water reservoir is filled, and wherein water flows through the Venturi pipe from the second Venturi nozzle terminal to the Venturi nozzle branch during a supply process.

It is thus possible, for example when the water reservoir is filled, for water to flow through the pipe system in such a way that a negative pressure is produced at a branch of the pipe system, which in this case is connected to the Venturi nozzle branch, in such a way that it is possible to substantially prevent water from flowing into the branch as it flows through the Venturi pipe. In particular, the water can thus reach the water reservoir directly and it is also possible to prevent water from accidentally flowing into a supply branch, even during a filling procedure. In particular if the water still has to undergo a disinfection process during the filling procedure, the water can thus be prevented from reaching the pipe system in an undisinfected state. By contrast, in the operating scenario where water is supplied, the water can flow to the second Venturi nozzle terminal via the first pipe, against the filling direction, and can then flow into the Venturi nozzle branch, but without flowing through the first Venturi nozzle terminal and through the second pipe, which is generally only used for a water filling procedure. In other words, during a filling procedure, water flows through the Venturi pipe making use of the Venturi effect, and therefore a negative pressure develops at the branch, wherein, during a water supply procedure, however, water flows backward through the Venturi pipe through the branch, whereby there is generally no Venturi effect.

In accordance with an embodiment of the invention, the Venturi pipe is configured in such a way that, when filling, a negative pressure develops at the branch when the water flows from the first Venturi nozzle terminal to the second Venturi nozzle terminal and, when supplying, a large flow cross-section is produced when water flows from the second Venturi nozzle terminal to the Venturi nozzle branch.

The Venturi pipe can thus be dimensioned in such a way that when water flows from the first to the second Venturi nozzle terminal, a negative pressure is just produced in the branch in such a way that water can be prevented from flowing into the branch, whereas when water flows through backwards from the second Venturi nozzle terminal to the branch, however, the greatest possible flow cross-section is provided. It should be noted that the geometrical dimensioning may be dependent on the flow rates, and both the negative pressure during the filling procedure and the flow cross-section during the distribution procedure can be used as parameters for the geometrical dimensioning of the Venturi pipe.

In accordance with an embodiment of the invention, the water supply system further comprises a second pipe, wherein the first Venturi nozzle terminal is connected to the second pipe for filling with fresh water.

The second pipe is thus used merely for a filling procedure, whereas water flows through the first pipe both during a filling procedure and during a water distribution procedure, but, during a water distribution procedure, in a reverse direction of flow to that during a filling procedure.

In accordance with an embodiment of the invention, the water supply system further comprises a third pipe, wherein the Venturi nozzle branch of the Venturi pipe is connected to the third pipe for water supply, wherein at least one tap is arranged downstream during water supply.

In accordance with an embodiment of the invention, the Venturi nozzle branch of the Venturi pipe is connected downstream via the third pipe to the water reservoir during water supply so as to form a circulating water circuit, wherein the at least one tap is arranged between the branch and the water reservoir.

Although it is not absolutely necessary for the third pipe to be connected to the water reservoir for the function of water withdrawal, a circulation circuit can still be provided via a terminal to the water reservoir, which enables continuous disinfection of the water if a disinfection device is provided, but also enables the water to be kept moving, for example so as to protect it against freezing.

In accordance with an embodiment of the invention, the water supply system further comprises a water disinfection device comprising a UV light generator for UV irradiation of water, wherein the water disinfection device is arranged between the second Venturi nozzle terminal and the water reservoir.

In this way, the water can be conveyed through the water disinfection device both during a replenishment procedure and during a water distribution procedure. In other words, water can flow toward the water disinfection device bi-directionally, and therefore said water disinfection device can disinfect the water both during replenishment and during water distribution. It should be noted that water disinfection devices other than a water disinfection device comprising a UV light generator can also be used instead, for example water disinfection devices based on an electrochemical process or based on the metering of a disinfectant into the water.

In accordance with an embodiment of the invention, a higher UV light intensity can be generated in the UV light generator during filling than during water supply.

During a filling procedure, the flow rates are generally higher, and a reliable disinfection procedure can thus be carried out as a result of a higher UV light intensity, whereas during water distribution, the flow rates are lower and therefore only a relatively low UV light intensity is required to carry out reliable disinfection. The energy consumption and operating time of the UV light generator can thus be reduced, which reduces energy consumption and also increases the service life of the water disinfection device, or at least prolongs the maintenance cycles.

In accordance with an embodiment of the invention, the water disinfection device comprises a plurality of UV light generator units, wherein a greater number of UV light generator units can be activated during filling than during water supply.

In this way, individual UV light generator units or a plurality of UV light generator units can be controlled separately, and the light intensity can thus be varied.

In accordance with an embodiment of the invention, all of the plurality of UV light generator units can be activated during filling, whereas a subset of the plurality of UV light generator units is activated during water distribution.

A number of overlapping UV light generator units can thus be used both during filling and during water distribution, so as to reduce the total number of UV light generator units.

In accordance with an embodiment of the invention, the UV light generator units can be activated alternately, at least in part, in a water distribution mode of operation.

In this way, in particular during water distribution, which normally extends over a longer period of time than a water filling procedure, the operating load can be distributed over different UV light generator units so that the individual UV light generator units are loaded in a more uniform manner. The light generator units therefore are not subject to stress of significantly varying degrees. Due to a corresponding sensor device, the light intensity can also be detected so as to activate a further UV light generator unit where necessary in the event of decreasing light intensity, or potentially to switch from a UV light generator unit of lower intensity to a UV light generator unit of higher intensity.

In accordance with an embodiment of the invention, the water supply system further comprises a particle trap, wherein the particle trap is arranged downstream of the branch of the Venturi pipe during supply.

Any particles present or which arise in the water supply system can thus be kept back from the water flow, so that said particles, which may sometimes also pose a danger, do not reach the water taps. For example, glass splinters may enter the water circuit as a result of glass breaking in a water disinfection unit which can thus be withdrawn from the water flow by the particle trap.

In accordance with an embodiment of the invention, the particle trap has an inlet opening, an elongate flow volume and an outlet opening, wherein the elongate flow volume comprises an extension in the direction of gravity, at least in part, the inlet opening having a smaller effective cross-section compared to the elongate flow volume, and the ratio of the effective cross-sections being measured from the inlet opening and flow volume in such a way that a reduction in the flow rate at the transition from the inlet opening to the flow volume is set in such a way that particles introduced through the inlet opening and having a higher density than water are kept back in the flow volume under gravity.

In particular, particles which are heavier than water, but which are carried along into the water pipes by the flow thus only experience a low flow force due to a targeted reduction of the flow rate in the elongate flow volume, and therefore the gravitational forces prevail and these particles can be kept back and/or can be deposited in the elongate flow volume and can thus no longer reach the outlet opening.

In accordance with an embodiment, the particle trap is dimensioned, in terms of particles, for glass splinters of a size which would be dangerous to human beings if swallowed.

In this way, glass shards and glass splinters produced in particular as a result of glass breaking in a disinfection system can be kept back in the particle trap. It should be noted that the effective cross-sections can be adapted relative to one another according to particle size and/or the density of the particles and also according to an expected particle shape, such that the desired effect of particles being deposited can be achieved.

In accordance with an embodiment of the invention, the water supply system comprises a pump, wherein the pump is arranged between the water reservoir and the second Venturi nozzle terminal.

In this way, specific pressure can be applied to the water so that the water can still be withdrawn, even at taps which are positioned somewhat higher, and has a desired water pressure at the tap, or so that a flow of circulating water can be provided.

In accordance with an embodiment of the invention, the water supply system further comprises a bypass pipe for the pump, wherein the bypass pipe discharges via a first terminal between the pump and the second Venturi nozzle terminal and is connected to a second terminal in such a way that, during a filling procedure, water can be introduced into a water reservoir, bypassing the pump.

In this way, during a filling procedure, for example, water can be prevented from flowing through a pump backwards, and a high pressure loss in the filling pipe can thus be avoided. Furthermore, a bypass pipe can be provided around the pump if the pump should fail or become blocked. In particular, if water only flows through the pump for water supply, but not for filling, the bypass pipe can be dimensioned so as to be correspondingly large, so that it can cope even with the relatively large flow rates during a filling procedure.

In accordance with an embodiment of the invention, an aircraft comprising a water supply terminal and a water supply system as described above is provided, wherein the water supply terminal is connected to the water supply system in such a way that the water supply system can be filled with fresh water during the filling procedure via the water supply terminal.

It should be noted that the individual features, as have been described above, can of course also be combined with one another, whereby advantageous effects beyond the sum of the individual effects may also be provided.

These and other aspects of the present invention will be explained and illustrated by the reference to the embodiments described in the following.

BRIEF DESCRIPTION OF THE DRAWINGS

Embodiments will be described in the following with reference to the following drawing.

The FIGURE shows a schematic arrangement and a schematic layout of a water supply system.

DETAILED DESCRIPTION

The FIGURE shows a schematic layout of a water supply system. A water supply system of this type can be used and arranged for example in an aeroplane. In the FIGURE, reference numeral 2 denotes the boundary of the aeroplane. The aeroplane or passenger transport vehicle comprises a terminal 90, to which an external water source can be connected, for example a water tanker. The water supply system shown in the FIGURE comprises a water reservoir 60, from which the water can be drawn for a water supply, for example of an aeroplane 2, this water reservoir acting as a reserve store for the water. The water reservoir can be filled in a first mode of operation A of the water supply system 1. For this purpose, a water source can be connected to a water supply terminal 90, for example on the outer skin of the aeroplane or aircraft, so that, in a first mode of operation A, the water flows through the water filling pipe or the second pipe 82 to fill the reservoir 60. The water then flows through the first pipe 81 to a water disinfection device 10 and enters the water disinfection device 10 through the opening 11, acting as a water inlet in the first mode of operation A or during a filling procedure. In the water disinfection device, the incoming water is disinfected before it reaches the water reservoir 60 via the pipe 87 through the second water terminal 12 acting as a water outlet during a filling procedure A. During the filling procedure, the water can flow backwards through the pump 40 via the pipe 86 into the water reservoir, the pump then being configured in such a way that it allows water to flow through backwards when deactivated. For example, this can be enabled by the use of a rotary pump. Alternatively however, the incoming water can also flow into the water reservoir 60, bypassing the pump 40, through the bypass pipe 50. The bypass pipe is connected to a pipe terminal 51 between the pump 40 or the pump outlet 41 and the second water terminal 12 of the water disinfection device 10. In this context, the second terminal 52 of the bypass pipe 50 can be connected either directly to the water reservoir 60 (as shown in the FIGURE), or may also discharge into the pipe 86 or the pipe 85 (not shown), and therefore the water reservoir itself does not require a separate terminal point to connect to the bypass pipe.

If water is to be withdrawn from the water reservoir 60, for example so as to supply water to a tap 70 in the aircraft 2, the water can be conveyed for example through the pipe 86 from the reservoir 60 to the pump terminal 42. As a result of the pump 40, a specific pressure can be applied to the water so that it flows from the pump outlet 41, through the pipe 87, through the second water terminal 12 and into the water disinfection device 10. The water supply system or the water disinfection device is provided in a second mode of operation B to supply the tap 70. After disinfection in the water disinfection device, the water then flows out through the first water terminal 11 of the water disinfection device 10. The water then flows through the first pipe 81 in the second mode of operation B to supply water to the tap 70 and then reaches the tap 70 via the third pipe 83, 84. The tap 70 can be actuated using a corresponding valve or a spigot. It should be noted that, for this operation, the bypass pipe 50 can be closed by a valve or by a shut-off element (not shown in this case), so that the water takes a defined path. During a filling procedure in mode of operation A, the flow rate of water is relatively high, since the water reservoir has to be filled within the shortest possible time so as to keep the holding time of an aircraft on the ground low. In the second mode of operation B, the water is withdrawn via the tap 70, but generally at a relatively low flow rate since consumption of the water often extends over a relatively long period of time. The water disinfection device 10 can therefore be configured in such a way that the intensity of treatment by the water disinfection device in a first mode of operation A when filling the water reservoir 60, that is to say at a high flow rate, is higher than in a second mode of operation B, in which the flow rate of water through the water disinfection device 10 is lower. For this purpose, the water disinfection device can be equipped with a UV light source or with a UV light generator, which for example consists of a plurality of UV light generator units 13, 14. This plurality of UV light generator units, for example in the form of individual UV lamps or UV tubes or UV light-emitting diodes, can be activated selectively and individually, so that, for example in a first mode of operation A, a greater number of UV light generator units can be activated than in the second mode of operation B. For example, during a filling procedure in the first mode of operation A, all or almost all UV light generator units may thus be activated, whilst only a subset thereof may be activated in the second mode of operation B. This subset can alternate over time. For example, one UV light generator unit may be switched off after a specific time, and a further UV light generator unit may be switched on. Due to the fact that the UV light generator units are switched on alternately over time, the individual UV light generator units can be loaded in a uniform manner. It should also be understood that only a subset of the UV light generator units may be activated or activated alternately so as provide uniform loading of the UV light generator units. For example, a detection device (not shown) may also be provided, which monitors whether the UV light generator units are operating reliably and still with sufficient intensity so as to accordingly prompt a corresponding switching on or switching off further UV light generator units as a function thereof, in accordance with the mode of operation. As a result of such a monitoring process, the system can also be provided with feedback as to whether a replacement of individual UV light generator units is necessary. The water disinfection device 10 can be equipped with such a redundant number of UV light generator units 13, 14, that a specific number of UV light generator units can fail, even in a first mode of operation A during a filling procedure, without impairing the normal disinfection of the water during a filling procedure at a high flow rate.

With a water disinfection device of this type, the water can be disinfected both during filling A of a water reservoir 60 and during supply B of water taps 70. In particular, the water can be disinfected by the same water disinfection device 10 during filling and during water withdrawal, the performance of the water disinfection device in terms of intensity being adaptable according to the varying flow rate between a maximum flow during filling and a significantly reduced flow rate during water withdrawal. For example, filling may occur at a rate of 100 or 150 liters/minute, which requires high radiation intensity in the water disinfection device 10, whereas flow rates of 1 to liters/minute for example can be provided during water withdrawal when supplying taps 70. The latter case requires a much lower radiation intensity, and therefore the water disinfection device does not have to be operated at full power, which saves energy and also increases the service life of the UV generator units. It should be noted that, in a second mode of operation B during water distribution, the water cannot only be disinfected when withdrawing at the taps 70, but also when the water is fed back into the water reservoir 60 via the pipe 85 in a circulation circuit. The water can thus be disinfected continuously, even if there is no explicit withdrawal at the taps 70.

When the water reservoir 60 is filled, the water flowing in via the pipe 82 is to flow, in the first mode of operation A, through the pipes 81 and 87 into the water reservoir 60 and has to be prevented from passing directly into the pipe 83 and thus the pipe 84 to the taps 70 and through the pipe 85 into the tank. If this were to happen, it could no longer be ensured that this water is disinfected as normal during the filling procedure, and successful disinfection overall during the filling procedure would thus be impaired. In order to prevent the water from flowing into the pipe 83 during a filling procedure, a Venturi pipe 20 can be provided at the branch, wherein the filling pipe 82 is connected to a first Venturi nozzle terminal 21, and the pipe 81 is connected to the second Venturi nozzle terminal 22. The pipe 83 is connected to the branch 23 of the Venturi pipe 20. When water flows from the first Venturi nozzle terminal 21 to the second Venturi nozzle terminal 22, the Venturi pipe causes the negative pressure to be set at the Venturi nozzle branch 23, and therefore a negative pressure is already set at the branch 23 as a result of the Venturi effect, merely due to the flow of the water during the filling procedure, and prevents water from flowing into the pipe 83 during the filling procedure. A shut-off element in the pipe 83 can thus be omitted, since a negative pressure is already set at this point due to the geometry of the Venturi pipe, or, at the least, pressure conditions develop at this point such that it is not possible for water to flow into the branch 23. It is thus ensured that the water flows into the water reservoir 60 exclusively via the pipes 82, 81, the water disinfection device 10, the pipes 87 and 86 and 50 via the corresponding water supply terminal 90 during the filling procedure. During water supply in a second mode of operation B, the water is guided from the water reservoir and through the water disinfection device 10 via the corresponding pipes 86, 87. The water then flows through the branch 23 into the third pipe 83, since the pipe 82 and the water supply terminal 90 are closed and thus constitute a dead-end, so as to thus reach the tap 70. In other words, in the first mode of operation A when filling the reservoir, the water flows from the first Venturi nozzle terminal 21 to the second Venturi nozzle terminal 22, whereas in the second mode of operation B when supplying the taps, the water flows from the second Venturi nozzle terminal 22 to the branch 23. With regard to nozzle geometry and the effective flow cross-section of the branch 23, the Venturi pipe can thus be configured in such a way that a relatively small negative pressure or even no pressure difference at all is provided at the branch 23 during a filling procedure, but a large flow cross-section is provided when water flows through from the second Venturi nozzle terminal to the branch. In other words, the geometries with regard to nozzle diameter and the diameter of the opening of the branch 23 can be matched to one another in such a way that these geometries are optimised to one another with the accordingly planned filling flow rates or withdrawal rates so as to meet the above conditions. For example, the Venturi nozzle diameter and/or the branch diameter can be enlarged at a predefined flow rate until a negative pressure is just provided at the branch 23. It should be understood that these geometries can be varied with different flow speeds or flow velocities so as to achieve this optimum between pressure conditions during filling and low flow resistance during water supply. Lastly, the Venturi pipe 20 is to be dimensioned in such a way that the objective of preventing water from flowing into the branch 23 during the filling procedure, and thus of achieving low flow resistance or high flow cross-section with backwards flow from the second Venturi nozzle terminal 22 to the branch 23, is met.

It should be noted that the function of the Venturi pipe 20 is substantially independent of the function of the water disinfection device 10. In other words, the bi-directional flow through the water disinfection device 10 can also be applied during a branch without a Venturi pipe 20, for example if the branch is closed by a valve. Likewise, the Venturi pipe branch can also be used if the water supply system is used without a disinfection device.

A particle trap 30 may be located in the supply pipe 83, 84, which is arranged between the branch between the pipe 82 and the pipe 81 or at the branch 23 of the Venturi pipe, said particle trap for example keeping back free particles from the water flow so that these particles do not reach the tap 70. For example, particles of this type may be sediments introduced during the filling procedure itself, but may also be fragments from devices of the water supply system, for example glass splinters from the water disinfection device 10, for example if a UV light generator unit 13, 14 breaks and glass particles enter the water supply system. Although such a situation is very unlikely, since the water disinfection device 10 is already safeguarded with great care against such situations, a particle trap 30 constitutes an additional protective measure, should particles of this type nevertheless enter the water supply system. For example, the particle trap is configured in the form of a widened, elongate flow volume 33, which has an inlet opening 31 to the pipe portion 83 and an outlet opening 32 at the opposite end. In the embodiment shown here, the particle trap is arranged in such a way that the longitudinal extent of the flow volume extends into the direction of gravity, wherein, based on the direction of gravity, the inlet opening 31 is arranged at the bottom and the outlet opening 32 is arranged at the top. Any particles present flow into the particle trap via the inlet opening 31. Due to the flow volume with a greater effective cross-section than the inlet opening 31, the flow rate slows down in the particle trap so that a particle having a higher density than water sinks or is kept back in the flow volume 33 under gravity. Physically speaking, in the inflow through the inlet opening 31, the flow force prevails over the gravitational force of a particle having a higher density than water, whereas, due to the slowed flow rate in the flow volume 33, the gravitational force is superior to the flow force and thus causes the particle to settle or sink. The particle can thus no longer reach the outlet opening 32 as a result of its sinking under gravity, and therefore water flowing out can reach the taps 70 free from such particles. A particle trap of this type has the advantage that it does not require any mechanically movable parts and is substantially maintenance-free, for example since no filter elements have to be replaced. For example, the flow cross-section of the flow volume 33 can be approximately three times as large as the flow cross-section of the inlet opening 31. The ratio of the cross-sections of flow can vary, however, according to the type and size of the expected particles, since a particle trap of this type is generally dimensioned for particles which pose a risk to human beings if swallowed.

It should be noted that particle traps of this type can be used irrespective of whether a Venturi pipe is used in the described embodiment or whether a water disinfection device is used in the described form. In particular, a particle trap of this type can be used whenever it is possible to orientate it in the direction of gravity and to arrange it before a tap 70.

It should be noted that, in addition to the field of application in aircraft, the present invention can also be applied in other means of transport, such as in trains, buses or ships.

It should also be noted that the term "comprising" does not exclude other elements or steps and the "a" and "one" does not exclude a plurality. Also elements described in association with different embodiments may be combined.

It should be noted that reference signs in the claims shall not be construed as limiting the scope of the claims.

The invention claimed is:

1. A water supply system, comprising
a first pipe;
a water reservoir; and
a Venturi pipe having a first Venturi nozzle terminal, a second Venturi nozzle terminal and a branch arranged between the first and second Venturi nozzle terminal,
wherein the second Venturi nozzle terminal is connected via the first pipe to the water reservoir,
wherein the first Venturi nozzle terminal is connectable to a second pipe to fill the water reservoir,
wherein the system further comprises a third pipe and the branch is connectable to the third pipe to supply water to taps, and
wherein the Venturi pipe is configured such that during a filling operation water flows through the Venturi pipe from the first Venturi nozzle terminal to the second Venturi nozzle terminal when the water reservoir is being filled, and during a supply operation water flows through the Venturi pipe from the second Venturi nozzle terminal to the branch during a water supply procedure,
wherein at least one tap is arranged downstream in the third pipe during the water supply procedure, and
wherein the branch of the Venturi pipe is connected downstream via the third pipe to the water reservoir during the water supply procedure so as to form a circulating water circuit, wherein the at least one tap is arranged between the branch and the water reservoir.

2. The water supply system according to claim 1, wherein the Venturi pipe is configured in such a way that, when filling, a negative pressure develops at the branch when the water flows from the first Venturi nozzle terminal to the second Venturi nozzle terminal, thereby preventing water from entering the branch, and, when supplying, water flows from the second Venturi nozzle terminal to the branch.

3. The water supply system according to claim 1, further comprising the second pipe, wherein the first Venturi nozzle terminal is connected to the second pipe for filling with fresh water.

4. The water supply system according to claim 1, further comprising a water disinfection device having a UV light generator for UV irradiation of water, wherein the water disinfection device is arranged between the second Venturi nozzle terminal and the water reservoir.

5. The water supply system according to claim 4, wherein a higher UV light intensity can be generated in the UV light generator when filling compared to when supplying.

6. The water supply system according to claim 4, wherein the water disinfection device comprises a plurality of UV light generator units, wherein a greater number of UV light generator units can be activated during filling than during supply.

7. The water supply system according to claim 1, further comprising a particle trap, wherein the particle trap is arranged downstream of the branch of the Venturi pipe during supply.

8. The water supply system according to claim 7, wherein the particle trap comprises:
an inlet opening;
an elongate flow volume; and
an outlet opening,
wherein the elongate flow volume comprises an extension in the direction of gravity, at least in part, wherein the inlet opening has a smaller effective cross-section compared to the elongate flow volume, and the ratio of the effective cross-sections of the inlet opening and flow volume being dimensioned in such a way that a reduction in the flow rate at the transition from the inlet opening to the flow volume is set in such a way that particles introduced through the inlet opening and having a higher density than water are kept back in the flow volume under gravity.

9. An aircraft comprising:
a water supply terminal; and
a water supply system comprising:
a first pipe;
a second pipe;
a third pipe;
a water reservoir; and
a Venturi pipe having a first Venturi nozzle terminal, a second Venturi nozzle terminal and a branch arranged between the first and second Venturi nozzle terminal,
wherein the second Venturi nozzle terminal is connected via the first pipe to the water reservoir,
wherein the first Venturi nozzle terminal is connectable to the second pipe to fill the water reservoir,
wherein the branch is connectable to the third pipe to supply water to taps,
wherein the Venturi pipe is configured such that during a filling operation water flows through the Venturi pipe from the first Venturi nozzle terminal to the second Venturi nozzle terminal when the water reservoir is being filled, and during a supply operation water flows through the Venturi pipe from the second Venturi nozzle terminal to the branch during a water supply procedure,
wherein the water supply terminal is connected to the water supply system in such a way that the water supply system can be filled with fresh water during the filling operation via the water supply terminal,
wherein at least one tap is arranged downstream in the third pipe during the water supply procedure, wherein the branch of the Venturi pipe is connected downstream via the third pipe to the water reservoir during the water supply procedure so as to form a circulating water circuit, wherein at least one tap is arranged between the branch and the water reservoir.

* * * * *